Feb. 8, 1938.                J. EDENBURG                2,107,372
                    FRICTION WHEEL POCKET LIGHTER
                         Filed May 18, 1936
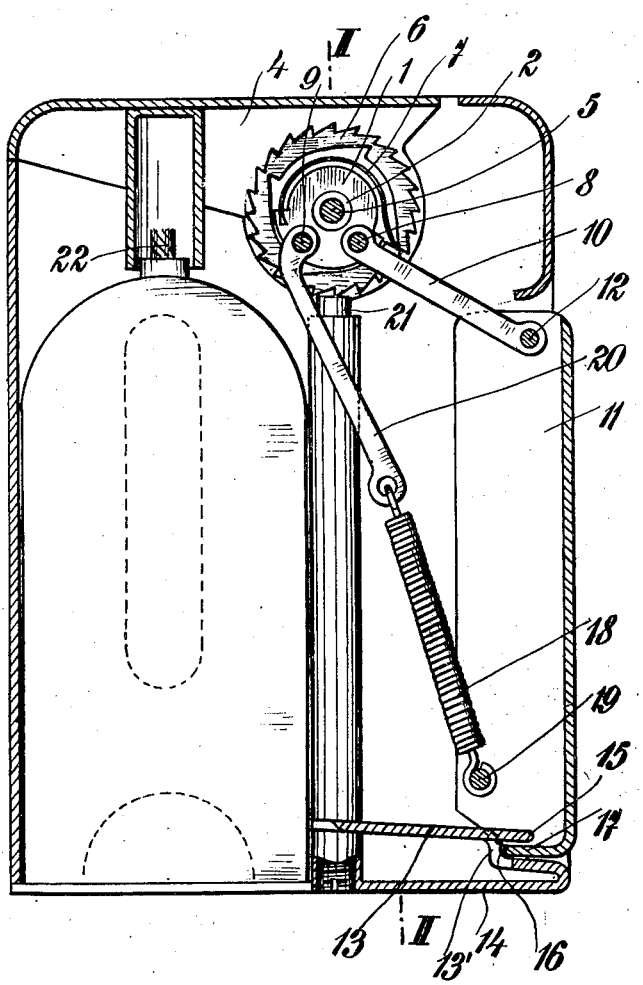
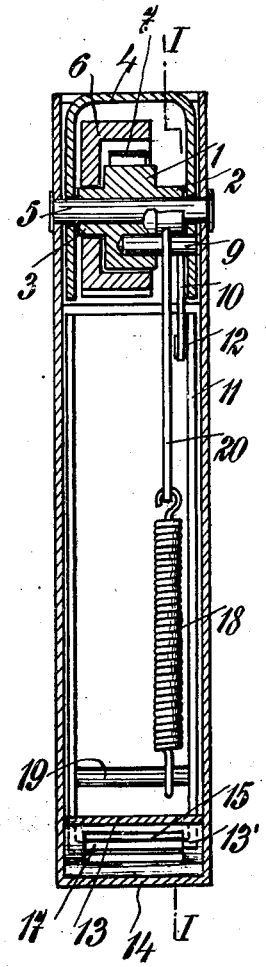

Patented Feb. 8, 1938

2,107,372

UNITED STATES PATENT OFFICE 2,107,372

FRICTION WHEEL POCKET LIGHTER

Josef Edenburg, Vienna, Austria

Application May 18, 1936, Serial No. 80,232

3 Claims. (Cl. 67—7.1)

This invention relates to a friction wheel pocket lighter in which a pressure lever forming one of the side walls of the lighter casing and hingedly connected thereto serves for moving the friction wheel carrier and the closing cap connected therewith.

The invention consists in that the pressure lever is oscillatably mounted in a bearing open towards the outer side and held in position against the bearing by a pull spring, which at the same time can form the return spring for the friction wheel carrier.

By this arrangement the internal mechanism of the lighter is easily accessible because the pressure lever can be lifted out of the bearing and easily removed from the lighter.

An embodiment of the invention is illustrated by way of example in the accompanying drawing in which:—

Fig. 1 shows the lighter in longitudinal section on line I—I of Fig. 2.

Fig. 2 is a vertical section on line II—II of Fig. 1.

The internal arrangement of the lighter is known. The friction wheel carrier 1 is lengthened by hubs 2, 3 to about the internal width of the closing cap 4 and rotatably mounted on a bolt 5. This bolt 5 is fixed in the lighter casing and forms the pivot axle for the closing cap 4. The friction wheel 6 is loosely rotatable on the hub 3 and surrounds the friction wheel carrier 1. A spring 7 of the friction wheel carrier 1 presses against the friction wheel 6. Two bolts 8 and 9 are fixed on one side face of the carrier 1. A link 10 is mounted on the bolt 8 and hingedly connected with a pressure lever 11 by means of a transverse bolt 12. The pressure lever 11 forms part of the side wall of the casing, and its lower end is, according to the invention, oscillatably mounted in a bearing open towards the exterior. The open bearing in the example illustrated consists of a sheet metal strip 13 which may form an extension of the casing wall 14 and has an outwardly bent flap 15 which, in conjunction with the bent part 13' of the flap 13 forms a kind of bearing cup 16. The lower shortened wall 17 of the pressure lever 11 loosely engages in this bearing cup with a certain clearance and is held permanently in its engaging position by means of a pull spring 18. One end of the pull spring 18 is hooked on a transverse bolt 19 of the pressure lever 11 and preferably forms at the same time the return spring for the friction wheel carrier. The other end of the spring 18 is connected with the friction wheel carrier by a connecting member 20 pivoted on the bolt 9. The friction wheel carrier 1 is positively coupled with the closing cap 4 by means of the bolts 8, 9.

The operation of the pocket lighter is known. By exerting pressure on the lever 11 the carrier 1 is oscillated, the closing cap 4 opened and the friction wheel 6 actuated by the spring 7. Sparks are thus produced by the cerium 21 and light the wick 22. When the pressure lever 11 is released, the friction wheel carrier 1 and the closure 4 jump back into their initial positions under the action of the pull spring 18.

I claim:—

1. A friction wheel pocket lighter, comprising in combination a casing, a friction wheel carrier in said casing, a closing cap connected with said friction wheel carrier, a bearing formed in said casing and open towards the outer side thereof, a pressure lever oscillatably mounted in said bearing and forming one of the side walls of said casing, a spring continually pulling said lever towards said bearing and holding it therein, and means connecting said lever with said carrier adapted to transmit the movement of said lever to said carrier and to said closing cap.

2. A friction wheel pocket lighter as specified in claim 1, in which the spring holding the pressure lever in the open bearing is connected with the friction wheel carrier so as to form at the same time the return spring for the friction wheel carrier.

3. A friction wheel pocket lighter as specified in claim 1, in which the open bearing comprises an inwardly bent extension of the bottom wall of the casing, a flap bent outward from this extension forming with said extension a kind of bearing cup adapted to oscillatably receive the lower wall of the pressure lever.

JOSEF EDENBURG.